(12) United States Patent
Yen

(10) Patent No.: US 12,380,347 B2
(45) Date of Patent: Aug. 5, 2025

(54) BIG DATA RELATED SCRIPT-BASED DECISION MANAGEMENT SYSTEM AND METHOD THEREOF

(71) Applicant: HUNG MING INFORMATION CO., LTD., Taichung (TW)

(72) Inventor: Chia Chun Yen, Taichung (TW)

(73) Assignee: Hung Ming Information Co., Ltd., Taichung (TW)

( * ) Notice: Subject to any disclaimer, the term of this patent is extended or adjusted under 35 U.S.C. 154(b) by 1000 days.

(21) Appl. No.: 17/471,612

(22) Filed: Sep. 10, 2021

(65) Prior Publication Data

US 2023/0004844 A1    Jan. 5, 2023

(30) Foreign Application Priority Data

Jul. 5, 2021   (TW) ................................. 110124662

(51) Int. Cl.
| | |
|---|---|
| *G06F 16/22* | (2019.01) |
| *G06N 5/045* | (2023.01) |
| *G16Y 40/20* | (2020.01) |

(52) U.S. Cl.
CPC ......... *G06N 5/045* (2013.01); *G06F 16/2219* (2019.01); *G16Y 40/20* (2020.01)

(58) Field of Classification Search
CPC ..... G06N 5/045; G06F 16/2219; G16Y 40/20
See application file for complete search history.

(56) References Cited

U.S. PATENT DOCUMENTS

| | | | |
|---|---|---|---|
| 10,678,628 B2 * | 6/2020 | McEwen | G06F 11/0793 |
| 2019/0109815 A1 * | 4/2019 | Nandan | H04W 40/20 |

\* cited by examiner

*Primary Examiner* — Loc Tran
(74) *Attorney, Agent, or Firm* — Rosenberg, Klein & Lee

(57) ABSTRACT

The present invention relates to a big data related script-based decision management system and method thereof that applies the Internet of Thing technology and adopts an open architecture for setting up a big data database. The big data database stores a plurality of data collected by a plurality of remote devices, wherein the data consists of a feature extracted from the operational statuses of a plurality of remote devices; an event that is formed by analyzing the feature; a script that stores the response strategy created based on the event; and a unit of analysis that produces a strategy result by comparing and analyzing the event and the script.

7 Claims, 10 Drawing Sheets

BIG DATA RELATED SCRIPT-BASED DECISION MANAGEMENT SYSTEM AND METHOD THEREOF

BACKGROUND OF THE INVENTION

1. Fields of the Invention

The present invention relates to the field of big data analysis technology, more specifically, a large volume of data related script-based event response decision making and management system.

2. Descriptions of Related Art

Currently, in an era when electronics, network, and information are blooming, big data have been widely used in applications. The big data analysis technology has been adopted in the fields of transportation, finance, politics, social media, medical and healthcare to form a large database by collecting various information through remote devices and conducting data analysis in order to understand the level of traffic congestion, trends of global finance, user or consumer behaviors. Therefore, the response strategy and management can be further arranged or improved based on the results of big data analysis.

Please refer to FIG. 9 and FIG. 10. In general, a conventional analysis and decision making system 9 that is commonly available applies the following steps for the decision making process. When the "feature" has developed into an "event" that occurs, personnel will immediately "assess" the status of the event based on the standard operating procedures (SOP) then access the computer system via manual operation to conduct query and retrieval of relevant data; personnel finally decide to personally call relevant departments/organizations to proceed with the event processing. However, it will take about 20 minutes from the time when of the event occurs to the time of finalizing the strategy.

For example, the conventional analysis and decision making system 9 is set up as a type of equipment maintenance system, as shown in FIG. 10. When the personnel learn that the operational status of a set of remote device 91 has formed a feature 92, which further develops an event 93, the personnel finally decide a response processing based on the event 93 and the SOP. For example, when an equipment of a closed-circuit television (CCTV) system has the feature of "black screen", it means the equipment of the "CCTV system" is at fault. Therefore, a dispatch for processing the "CCTV system" is needed. A second example is that when the CCTV system has a black screen and the network does not respond to ping, it is a "network outage" event that requires "network engineers" to handle the event. If the CCTV system has a black screen but the network is responding to ping requests successfully, then this is an "equipment" event and "hardware engineers" should be dispatched to handle the event.

Therefore, the operational process of the aforementioned conventional analysis and decision making system 9 not only consumes much more time, but also produces a rigid and less flexible response strategy based on the SOP process conducted by the personnel. Such response strategy has less automation efficiency compared to that of AI intelligence, resulting in the personnel unable to quickly handle the event comprehensively.

SUMMARY OF THE INVENTION

In view of this, the inventor of the present invention develops a big data related script-based decision management system and method thereof. The main objective of the present invention is to provide an intelligent analysis that utilizes the Internet of Thing (IoT) technology and big data to generate better strategic management and effectively maintain remote devices, so that unexpected and complex incidents can be quickly managed when occur. In order to achieve the aforementioned objective, the present invention herein utilizes the following technological means.

The present invention relates to a big data related script-based decision management system that applies the Internet of Thing technology and adopts an open architecture for setting up a big data database. The big data database stores a plurality of data collected by a plurality of remote devices, wherein the data consist of a feature extracted from the operational statuses of a plurality of remote devices and stored in the big data database; an event that is formed by analyzing the feature and stored in the big data database; a script that stores the response strategy created based on the event and stored in the big data database; and a unit of analysis that produces a strategy result by comparing and analyzing the event and the script.

Furthermore, the present invention relates to a big data related script-based decision management method that comprises: a data collection step that collects data of operational statuses of a plurality of remote devices and further integrates data formats thereof and stores the data in a big data database; a feature annotation and labeling step that analyzes data, annotates and labels data with the feature and stores the data in the big data database; an event construction step that analyzes the features of data to form the event and stores the event in the big data database; a script construction step that constructs a script to store the response strategy created based on the event; and an analysis and processing step that constructs a unit of analysis to produce a strategy result by comparing and analyzing the module and the script.

DETAILED DESCRIPTION OF THE PREFERRED EMBODIMENT

Figure 1:
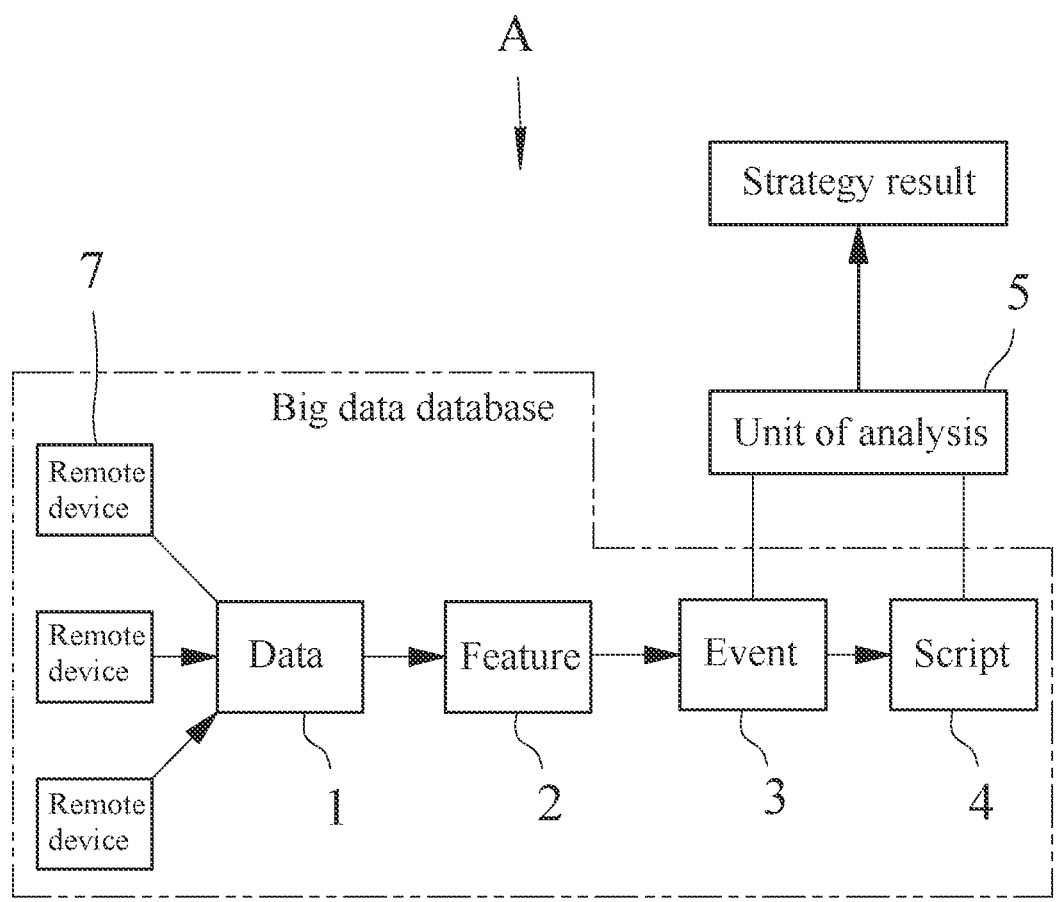
FIG. 1 an architecture diagram of the big data related script-based decision making process of the present invention.

First, please refer to FIG. 1. The present invention relates to a big data related script-based decision management system and method thereof that utilizes the Internet of Thing (IoT) technology and mainly collects the operational statuses of the remote devices 7 equipped with edge computing or without edge computing. After the operational statuses of the remote devices 7 are converted to digitized program data structures and all the program data structures are further integrated and undergo intelligent analysis by python, C++ software programs, a strategy result of the response method for the remote devices 7 is generated.

The architecture of the big data related script-based decision management system A includes setting up a big data database. The big data database stores a plurality of data 1 collected by a plurality of remote devices 7, wherein the data 1 consists of a feature 2 extracted from the operational statuses of a plurality of remote devices 7 and stored in the big data database; an event 3 that is formed by analyzing the feature 2 and stored in the big data database; a script 4 that stores the response strategy created based on the event 3; and a unit of analysis 5 that produces a strategy result by comparing and analyzing the event and the script.

Figure 2:
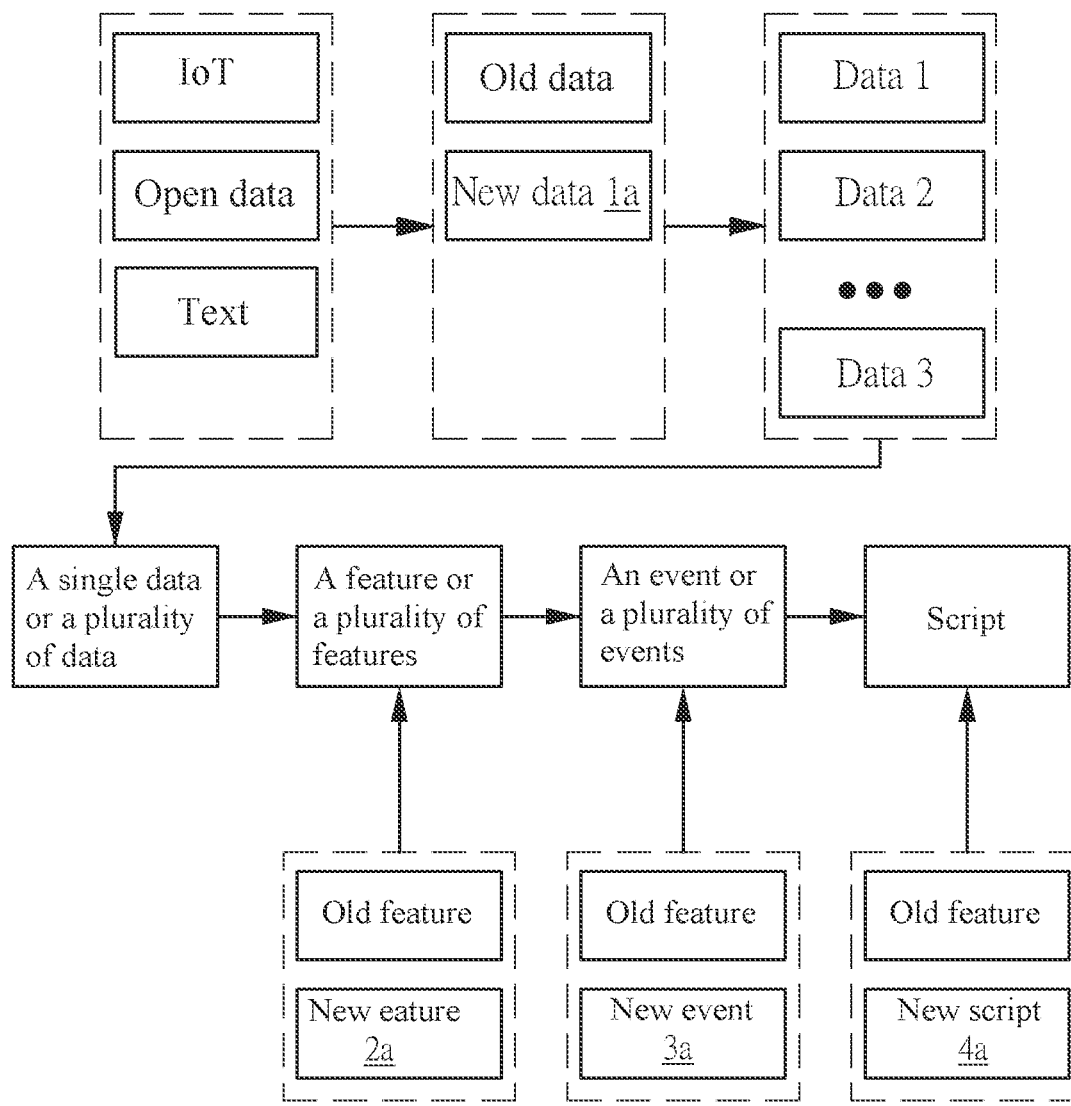
FIG. 2 a schematic diagram of the open architecture adopted by the present invention.

Furthermore, the composition elements of the architecture of the present invention all adopt an open type program data structure to enhance the applicability and flexibility of the present invention. For example, the present invention is applicable to decision management in the fields of transportation, finance, politics, social media, medical and healthcare; in other words, as shown in FIG. 2, the present invention can apply manual or artificial intelligence (AI) based intelligent automatic method to define the new data 1a, new features 2a, new events 3a, and new scripts 4a of program data structures.

Figure 3:
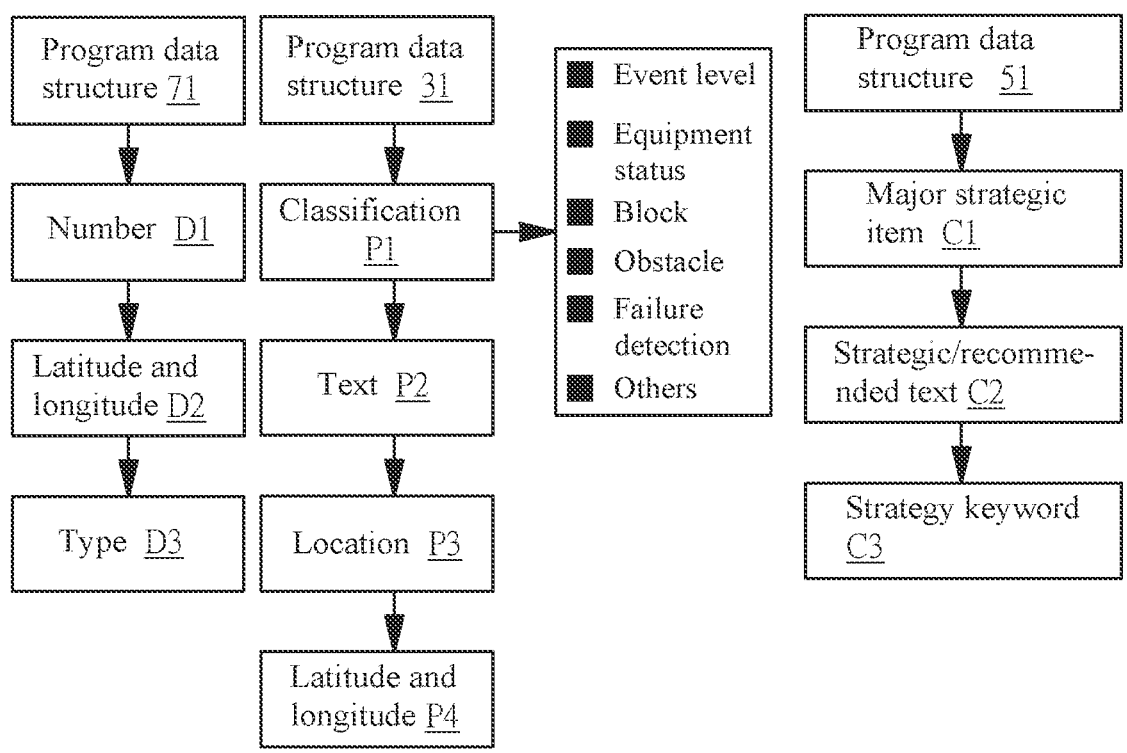
FIG. 3 a schematic diagram of the program data structure of the feature, event and script of the present invention.
Figure 4:
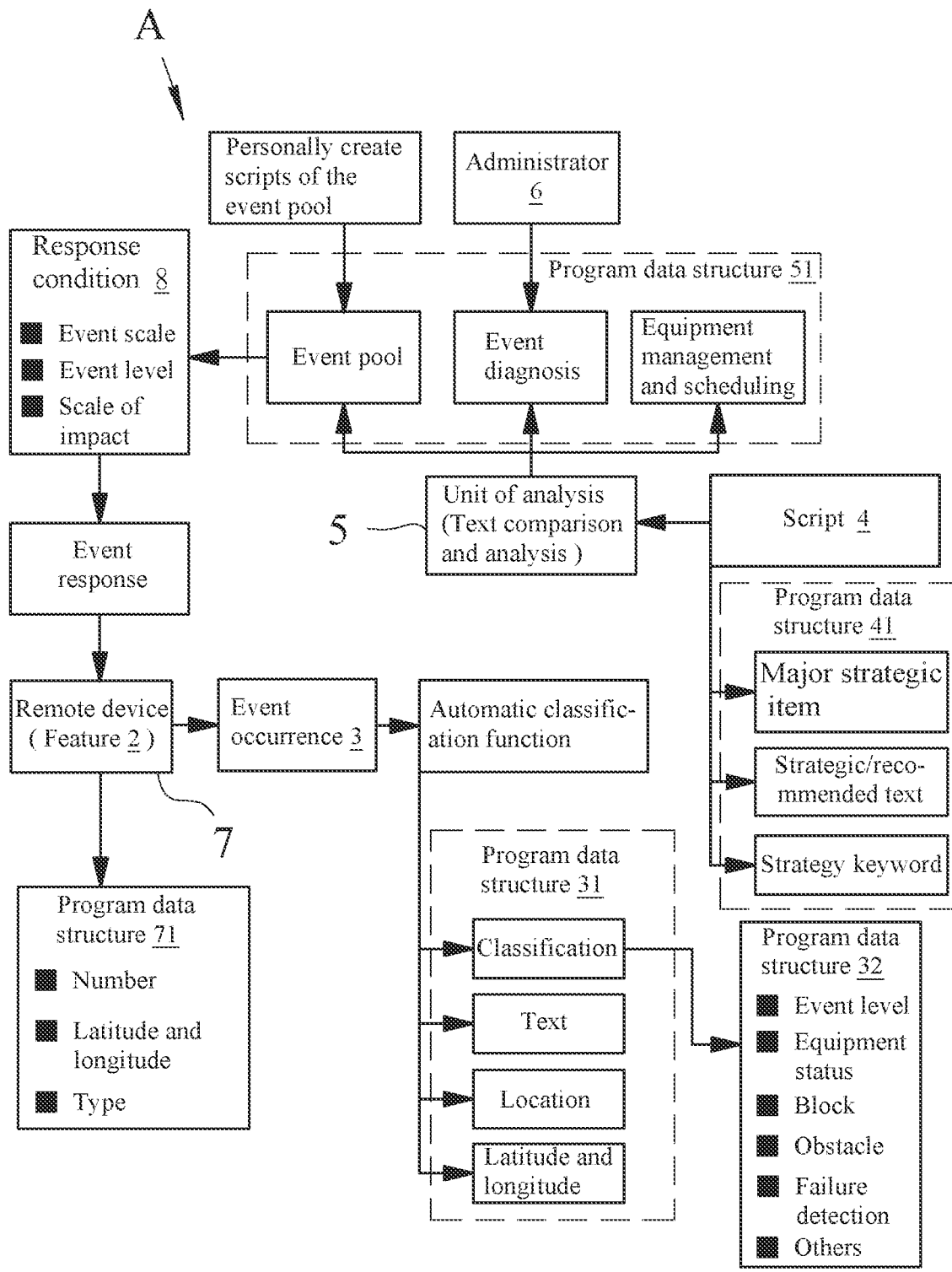
FIG. 4 an architecture diagram of the big data related script-based decision management system of the present invention.

Please refer to FIG. 3 and FIG. 4. The remote device 7 further provides a program data structure 71 that comprises a number D1, a latitude and longitude D2, and a type D3. The program data structure 71 is comparatively better for having integrated IoT data file formats including web pages (xml format), text files (text format), image files (png format), streaming video files (stream format). The present operational status of the remote device 7 is the feature 2; the feature 2 can have a textual or graphical program data structure 71 wherein the program data structure 71 can be web pages or files in statement style. When the present operational status of the remote device 7 has an unexpected failure, an event is formed and occurs.

The event 3 further comprises an indexing and automatic classification function. The indexing and automatic classification function generates a program data structure 31 containing a classification P1, a text P2, a location P3, and a latitude and longitude P4, for the occurrence of the event, wherein the event classification further comprises a program data structure 32 containing an event level, an equipment status, a block, an obstacle, and a failure detection.

The script 4 is set as the linkages between each event group, including personnel and equipment, and comprises a program data structure 41 containing a major strategic item C1, a strategic/recommended text C2, and a strategy keyword C3. Last, the program data structure 31, generated by the indexing and automatic classification of the event 3, and the aforementioned script 4 are compared and analyzed by the unit of analysis 5 to produce a strategy result, wherein the strategy result comprises a program data structure 51 containing an equipment management and scheduling, an event diagnosis, and an event pool 30.

It is worth mentioning that the event diagnosis grants access to an administrator 6 to input opinions thereof; the event pool 30 also grants access to the administrator 6 to create scripts of the event pool. In addition, a response condition 8 is set up to filter the event pool 30, that is, when the response condition 8 is met, an event response is generated to issue an emergency notice to external relevant units to handle the condition of the remote device 7 together. The response condition 8 comprises a program data structure consisting of event scale, event level, and scope of impact. For example, the fire detection remote devices 7 in the computer room and the chairman's office detect a fire at the scene. Since the chairman's office belongs to the first level of importance plus the fire alarm is also an event of the first level of danger, the system automatically determines this event as a fire of a specific scale. Therefore, the system will not only automatically contact the chairman or staff, but also coordinate to notify the fire department for support.

Figure 5:
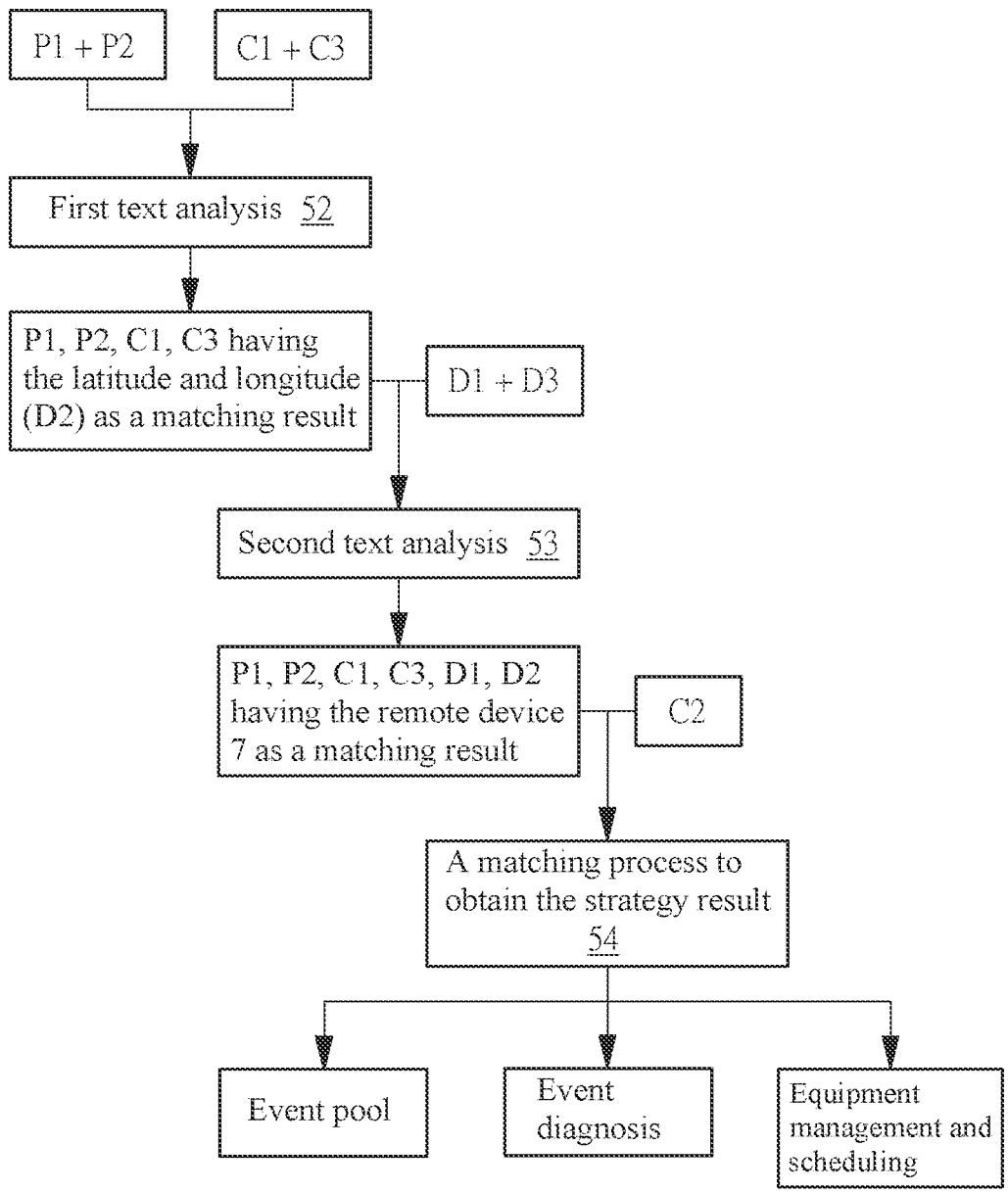
FIG. 5 a schematic diagram of the process of analysis and processing of the big data related script-based decision management system of the present invention.

Thus, the present invention has a comparatively better solution of a big data related script-based decision management system. Please refer to FIG. 5. The present invention mainly uses the unit of analysis 5 to conduct comparison and analysis of the event 3 and the script 4. The text comparison and analysis further comprises a first text analysis 52, a second text analysis 53, and a strategy result 54 presented after matching. In other words, the first text analysis 52 generates the latitude and longitude (D2) as a matching result by the comparison between the classification (P1) and the text (P2), and between the major strategic item (C1) and the strategic/recommended text (C2). After the latitude and longitude (D2) undergoes the second text analysis 53 with the number (D1) and the type (D3), the remote device 7 is obtained. Next, the remote device 7 and the strategic/ recommended text (C2) undergo a matching process to obtain the strategy result 54 to be applied to subsequent processing of the remote device 7.

Figure 6:
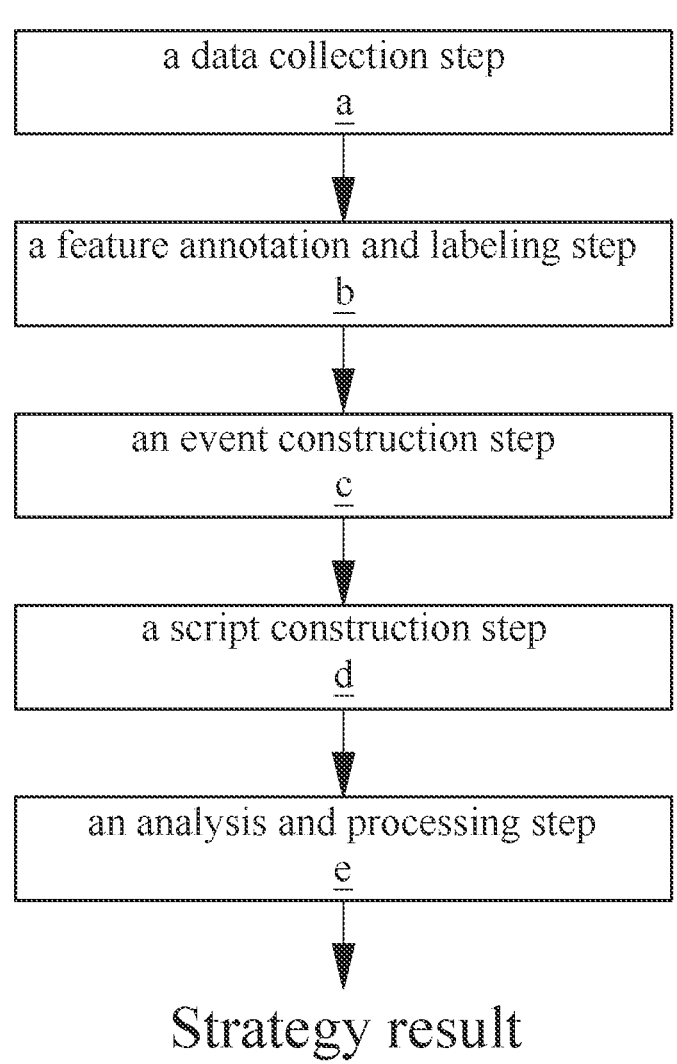
FIG. 6 a flow chart of steps of the big data related script-based decision management method of the present invention.

The big data related script-based decision management method B can be derived from the summary of the big data related script-based decision management system A, as shown in FIG. 1 and FIG. 6, and comprises the following steps: a data collection step a that collects data of operational statuses of a plurality of remote devices 7 and further integrates data formats thereof and stores the data in a big data database; a feature annotation and labeling step b that analyzes data, annotates and labels data with the feature and stores the data in the big data database; an event construction step c that analyzes the features of data to form the event and stores the event in the big data database; a script construction step d that constructs a script to store the response strategy created based on the event and stores the script in the big data database; and an analysis and processing step e that constructs a unit of analysis to produce a strategy result by comparing and analyzing the module and the script.

Figure 7:
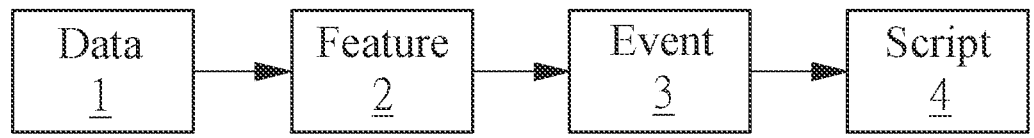
FIG. 7 a schematic diagram of an embodiment of the present invention implemented in traffic and road decision management.
Figure 7:
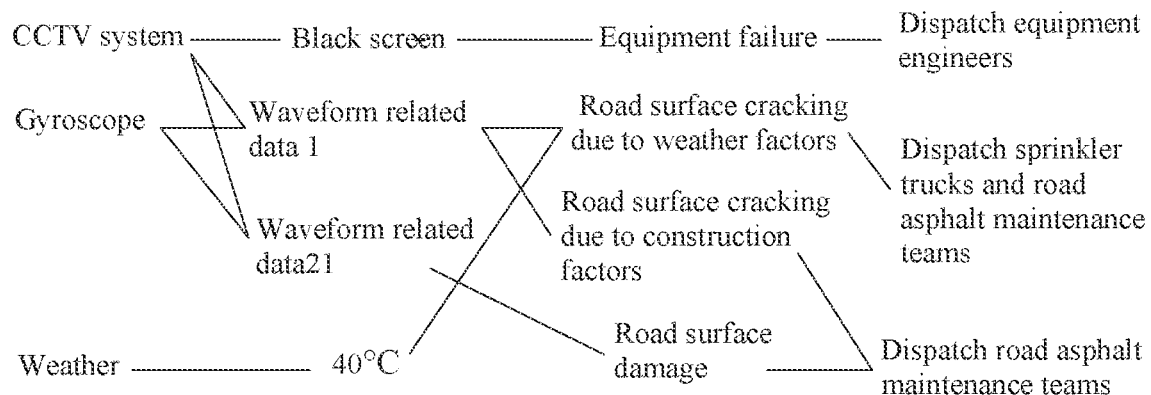

For instance, the present invention can be implemented to a traffic and road decision management system C, as shown in FIG. 1 and FIG. 7, having data 1 collected by the remote device 7 that comprises at least a CCTV system (including the monitor), at least a road test equipment equipped with a gyroscope. The data 1 also consists of weather data collected from the Central Weather Bureau through internet; the feature 2 is defined to include "black screen" images, electric voltage, or the "waveform related data 1" and "waveform related data 2" of electric current; the event 3 is defined to include "failure", "road surface cracking due to weather factors", "road surface cracking due to construction factors", and "road surface damage"; the script 4 is defined to include "dispatch equipment engineers", "dispatch sprinkler trucks and road asphalt maintenance teams", and "dispatch road asphalt maintenance teams".

Therefore, using the aforementioned traffic and road decision management system C, as shown in FIG. 7, which utilizes data collected by the remote device 7 and conducts big data related script-based intelligent analyses, a strategic response is generated automatically in order to conduct road maintenance effectively. One example is that when a black screen of the CCTV system occurs, it can be determined as an equipment failure and a match with "dispatch equipment engineers" of the script 4 for conducting maintenance on the CCTV system. Another example 2 is that, according to the CCTV system or based on the "waveform related data 1" and "waveform related data 2" of the gyroscope, it is determined as the case of "road surface cracking due to construction factors" or "road surface damage" and a match with "dispatch road asphalt maintenance teams" of the script 4 for conducting maintenance on the road surface. Example 3 is further provided to demonstrate that, according to the CCTV system or based on the "waveform related data 1" of the gyroscope in conjunction with the local temperature of 40° C., it is determined as the case of "road surface cracking due to weather factors" and a match with "dispatch sprinkler trucks and road asphalt maintenance teams" of the script 4 for conducting maintenance on the road surface.

Figure 8:
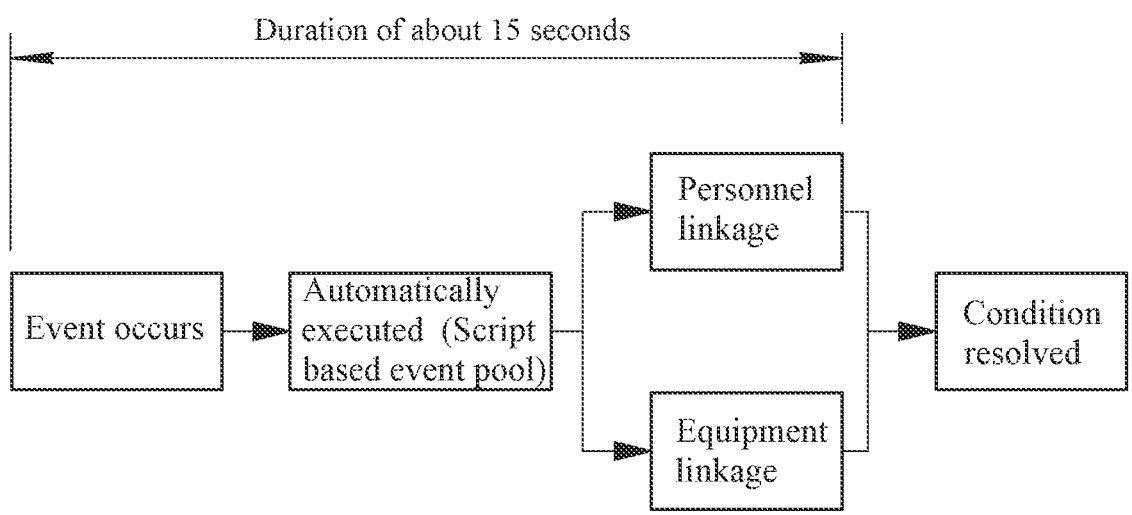
FIG. 8 a specific flow chart of the big data related script-based decision management method of the present invention.
Figure 9:
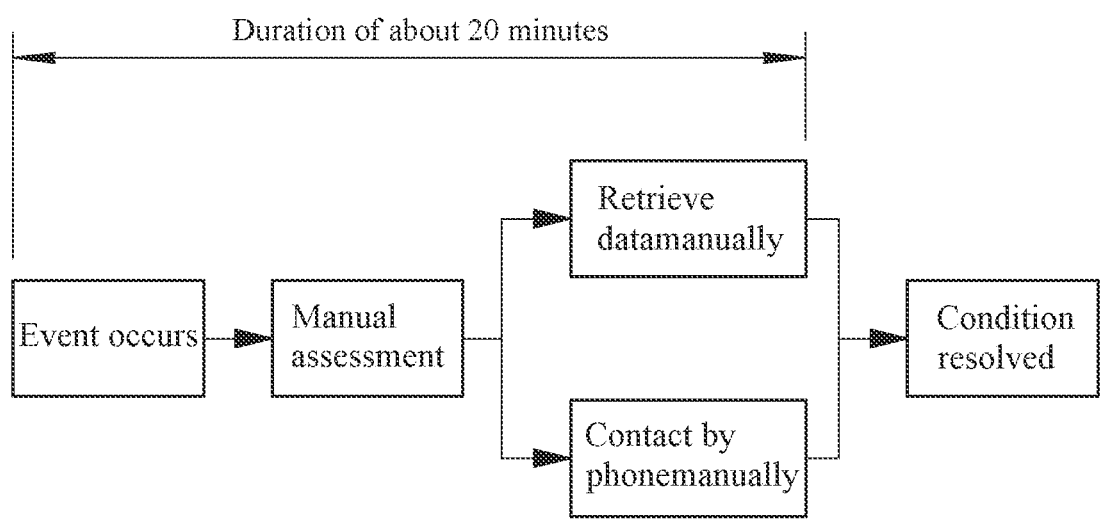
FIG. 9 a flow chart of analysis and processing of a conventional decision management system.
Figure 10:
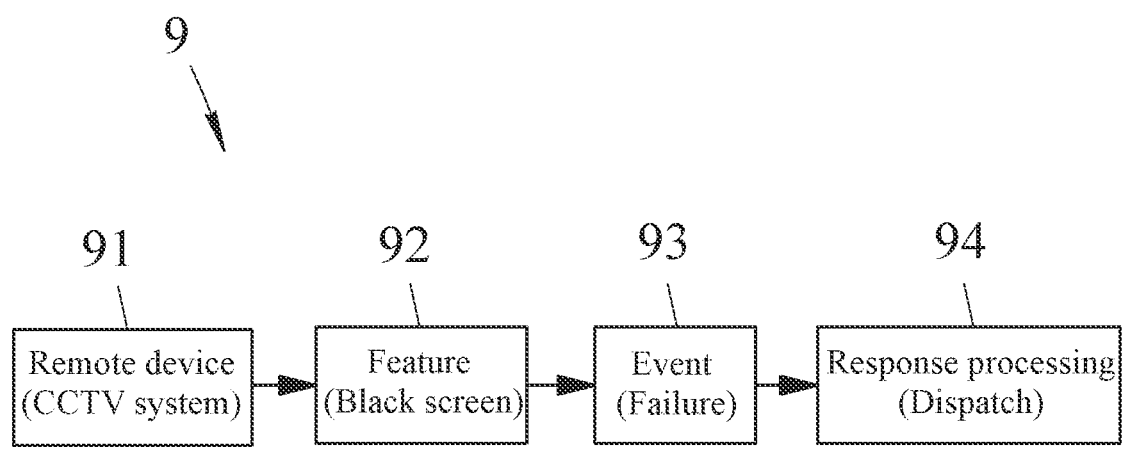
FIG. 10 a diagram of the process of analysis and processing of a specific embodiment of a conventional decision management system

As demonstrated in FIG. 8 and FIG. 9, the implementation of the big data related script-based decision management system and method thereof of the present invention that comprises script-based event pool 30 and the linkage between equipment and personnel, only takes a duration of 15 seconds. In comparison with the time needed for processing a conventional incident by the present invention and that by the conventional analysis and decision making system 9, the results are shown in Table 1 below.

TABLE 1

| Target item | The present invention (Script-based event pool 30) | Duration of processing a conventional incident | Result |
| --- | --- | --- | --- |
| Time required to assess the scale of the incident | 5 seconds | 5 minutes | 60 times faster |
| Time required to process and retrieve data | 5 seconds | 5 minutes | 60 times faster |
| Time required to transmit messages by the control device | 5 seconds | 10 minutes | 120 times faster |
| Total duration time | 15 seconds | 20 minutes | 80 times faster |

According to Table 1, the big data related script-based decision management system and method thereof of the present invention that automatically executes the response processing using the script-based event pool is 60 times faster than the conventional method in the target item of "Time required to assess the scale of the incident", 60 times faster in the target item of "Time required to process and retrieve data", and 120 times faster in the target item of "Time required to transmit messages by the control device". The total duration time of processing the incident by the present invention is 80 times faster than that of the conventional analysis and decision making system 9, as shown in FIG. 8 and FIG. 9.

What is claimed is:

1. A big data-related script-based decision management system, the big data-related script-based decision management system applying Internet of Thing technology and comprising:
   a processor;
   a big data database; and
   an analysis unit;
   wherein the big data database stores a plurality of data indicia, the stored plurality of data indicia, including:
   raw data collected from a plurality of remote devices, wherein the raw data collected from the plurality of remote devices includes at least data indicating operational statuses of a corresponding one of the remote devices;
   feature data, the feature data being generated by analyzing data extracted from the data indicating operational statuses of the plurality of remote devices and for storage in the big data database;
   event data, the event data being generated by analyzing the feature data and the raw data collected from the plurality of remote devices and for storage in the big data database, wherein the event data is generated by indexing and automatically classifying the feature data and the raw data collected from the plurality of remote devices, the indexing and automatic classification, including, generating a program data structure having a classification (P1), a text (P2), a location (P3), and a latitude and longitude (P4); and
   script data, the script data being generated for storing a response strategy in correspondence with respective event data and for storage in the big data database, wherein the script data includes a program data structure having a major strategic item (C1), a strategic/recommended text (C2), and a strategy keyword (C3); and
   wherein the analysis unit generates a strategy result by comparing and analyzing the event data with respective script data, wherein the strategy result includes a program data structure having an equipment management and scheduling, an event diagnosis, and an event pool, the event diagnosis granting access to an administrator to input a corresponding opinion and the event pool granting access to the administrator for generating scripts of the respective event pool.

2. The big data-related script-based decision management system as claimed in claim 1, wherein the big data database employs an open architecture and further employs either one of a manual method or an artificial intelligence (AI) based automatic method to define new raw data, new feature data, new event data, and new script data.

3. The big data-related script-based decision management system as claimed in claim 1, wherein each of the plurality of remote devices includes a program data structure having a number (D1), a latitude and longitude (D2), and a type (D3).

4. The big data-related script-based decision management system as claimed in claim 1, wherein the classification (P1) of the program data structure of the event data further includes a program data structure having an event level, an equipment status, a block, an obstacle, and a failure detection.

5. The big data-related script-based decision management system as claimed in claim 3, wherein the analysis unit further includes a first text analysis and a second text analysis; wherein the first text analysis includes generating the latitude and longitude (D2) as a matching result by comparing the classification (P1) with the text (P2) and by further comparing the major strategic item (C1) with the strategic/recommended text (C2); wherein the second text analysis includes the latitude and longitude (D2) being analyzed along with the number (D1) and the type (D3), and a corresponding one of the remote devices being obtained as another matching result subsequent to completion of the first and second text analysis; and the corresponding remote device and the strategic/recommended text (C2) undergoing a matching process to generate the strategy result.

6. The big data-related script-based decision management system as claimed in claim 1, wherein response conditions are defined for filtration of the event pool, wherein when one of the response conditions are met, a corresponding event response is generated, the event response issuing an emergency notice to a respective external unit for fixing the corresponding remote device; the response condition including a program data structure having event scale, event level, and scope of impact.

7. A big data-related script-based decision management method, comprising:

a data collection step including collecting raw data from a plurality of remote devices and storing the collected raw data in a big data database, wherein the raw data collected from the plurality of remote devices includes at least data indicating operational statuses of a corresponding one of the plurality of remote devices;

a feature annotation and labeling step including analyzing data extracted from the data indicating operational statuses of the plurality of remote devices and further annotating and labeling the analyzed data with corresponding feature indicia to generate feature data for storage in the big data database;

an event construction step including analyzing the feature data and the raw data collected from the plurality of remote devices to generate event data for storage in the big data database, wherein the event data is generated by indexing and automatically classifying the feature data and the raw data collected from the plurality of remote devices, the indexing and automatic classification, including, generating a program data structure having a classification (P1), a text (P2), a location (P3), and a latitude and longitude (P4);

a script construction step including generating script data to store a response strategy in correspondence with respective event data and for storage in the big data database, wherein the script data includes a program data structure having a major strategic item (C1), a strategic/recommended text (C2), and a strategy keyword (C3); and an analysis and processing step including generating via an analysis unit a strategy result by comparing and analyzing the event data with respective script data, wherein the strategy result includes a program data structure having an equipment management and scheduling, an event diagnosis, and an event pool, the event diagnosis granting access to an administrator to input a corresponding opinion and the event pool granting access to the administrator for generating scripts of the respective event pool.

* * * * *